United States Patent Office.

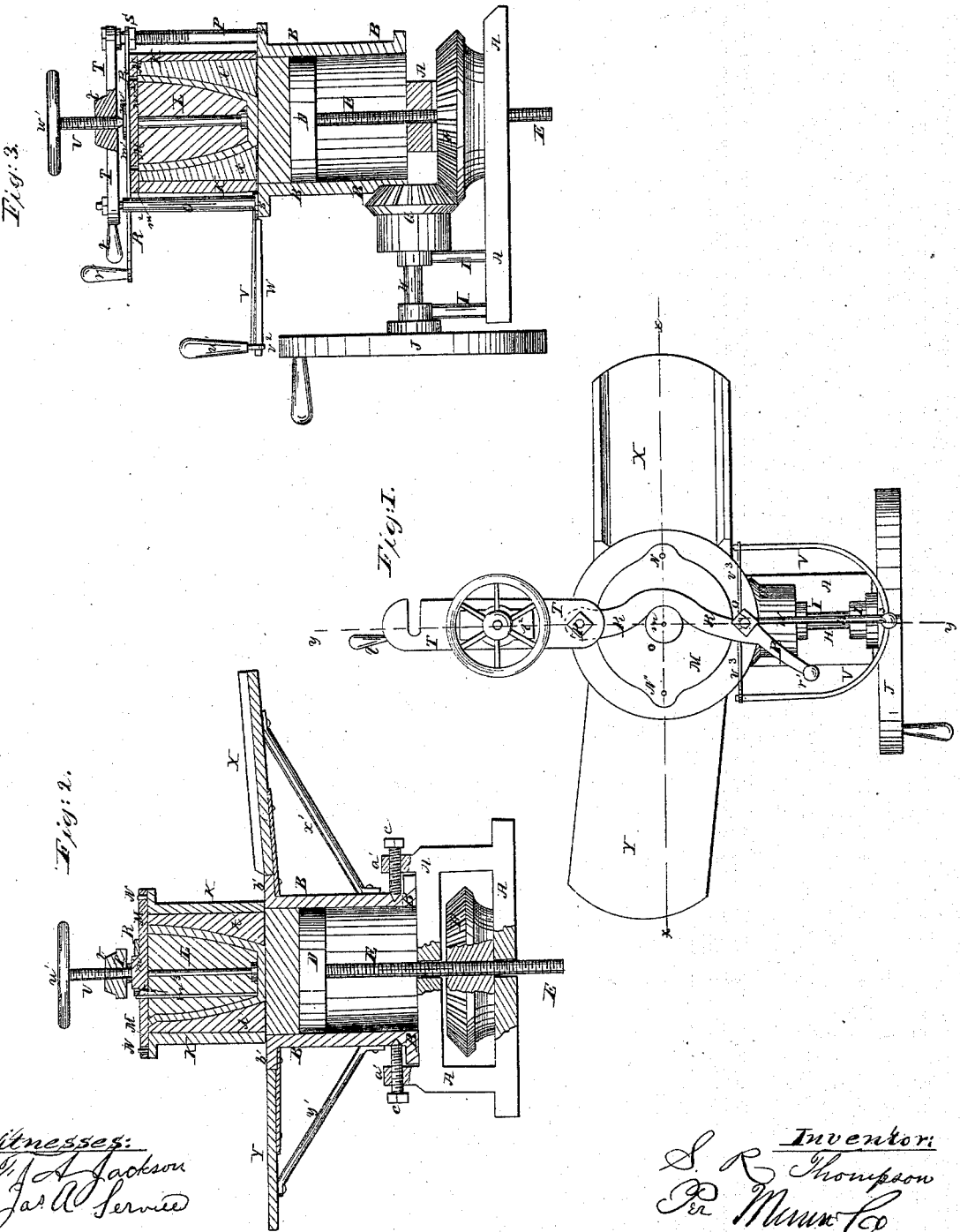

IMPROVED MACHINE FOR MAKING CRUCIBLES.

SAMUEL R. THOMPSON, OF PORTSMOUTH, NEW HAMPSHIRE.

Letters Patent No. 60,090, dated November 27, 1866.

SPECIFICATION.

TO ALL WHOM IT MAY CONCERN:

Be it known that I, SAMUEL R. THOMPSON, of Portsmouth, in the county of Rockingham, and State of New Hampshire, have invented a new and useful improvement in Machine for Moulding Crucibles, &c.; and I do hereby declare that the following is a full, clear, and exact description thereof, which will enable others skilled in the art to make and use the same, reference being had to the accompanying drawings, forming part of this specification, in which—

Figure 1 is a top view of my improved machine, the binding-bar being thrown back.

Figure 2 is a vertical section of the same taken through the line $x\,x$, fig. 1.

Figure 3 is a vertical section of the same taken through the line $y\,y$, fig. 1.

Similar letters of reference indicate like parts.

My invention has for its object to furnish an improved machine by means of which crucibles and other vessels may be moulded from any suitable plastic material perfectly and rapidly; and it consists, first, in the combination of the cylinder, piston-head, screw piston-rod, bevel gear-wheels, shaft, and crank-wheel with each other and with the frame of the machine, for the purpose of forcing the material up into the mould; second, in the combination of the case, core, and cover of the mould with each other, when said parts are constructed and arranged as hereinafter more fully described; third, in the combination of the swinging guide-bar, swinging binding-bar and centering screw with each other, with the cover of the mould, and with the pillars by which they are supported; fourth, in the combination of the wire, bow, and guide-rod, with each other and with the cylinder and mould, for the purpose of separating the moulded vessel from the material left in the cylinder; the whole being constructed and arranged as hereinafter more fully described.

A is the frame of the machine, which is set upon and secured to a bench, table, or other suitable support. Upon the top of the frame A is placed the hollow cylinder, B, which is secured in place by the set-screws C, passing in through the upwardly projecting ends of the posts, $a^1$, of the frame A, as shown in fig. 2. D is the piston-head, which exactly fits the interior of the cylinder B, and works up and down therein as it is moved by the operation of the screw piston-rod, E. The piston-rod E is attached to the piston-head D, thence it passes down through the frame A, and through the bevel gear-wheel, F, and it has a screw-thread cut upon it throughout its entire length. The screw-thread cut upon the rod E fits into a corresponding screw-thread cut in the hole in the bevel gear-wheel, F, through which the said screw-rod passes, so that by the revolution of the said gear-wheel the rod E, and with it the piston-head D, will be raised or lowered. G is a bevel gear-wheel, the teeth of which mesh into the teeth of the gear-wheel F, as shown in fig. 3. The wheel G is attached to the end of the shaft H, which revolves in bearings in supports I, attached to the frame A, as shown. To the other end of the shaft H is attached the crank-wheel, J, which is made large and heavy, in proportion to the size of the machine, so as to give to the machine sufficient momentum to fill the mould with the plastic material. K is the case or cylinder of the mould, which is lined with clay, $k'$, or other suitable material, and the lower edge of which rests upon the upper edge of the cylinder B, as shown in figs. 2 and 3. The interior of the lining, $k'$, or the cavity of the mould, is made of the exact form which it is desired the outside of the crucible or other vessel should have. L is the core, which is made of the form of the interior of the crucible or other vessel, and the upper end of which is secured to the cover M, in such a position that when in place it may hang exactly in the centre of the cavity of the mould, making the sides of the crucible of uniform thickness. The core L may be made of any suitable material, but I prefer to make it of wood, as answering the purpose better than other materials. M is the cover which rests upon the upper edge of the case or cylinder K, and is guided into its proper position by guide-pins, N, attached to the upper edge of the case or cylinder K, and entering holes in the cover M, as shown in fig. 2. Upon the upper side of the cover M, exactly at its centre, is formed a cylindrical projection, $m^1$, having a hole or depression formed in its centre, as show in figs. 1, 2, and 3, for exactly centering the mould when being placed in position upon the upper edge of the cylinder B. The cylindrical projections $m^1$, are all made of exactly the same size, whatever may be the size of the mould to the cover of which it is attached, so that it may always exactly fit into the curved depression in the guide-bar R. O and P are pillars, the lower ends of which are attached to the projecting flange, $b'$, formed around the upper edge of the cylinder B. To the upper part of the post P is pivoted the end of the guide-bar R, said bar being held in the proper position by the nut S. Upon the upper part of the post P is cut a screw-thread, so that the elevation of the guide-bar, R, may be adjusted to the height of the mould to be used. The edge of the bar R which is towards the side of the machine at which the mould is inserted is curved or hollowed, as shown in fig. 1, to serve as a guide in placing the said mould in the right position, and in the rear edge is formed a notch which fits upon the post O, as shown in figs. 1 and 3. $r^1$ is a handle attached to the end of the bar R, for convenience in operating it. To the upper end of the post P is pivoted the end of the binding-bar, T, in the front edge of which is formed a notch, into which the upper end of the post O enters when the bar is brought into the position shown in fig. 3. $t^1$ is a handle attached to the end of the bar T, for convenience in operating it. Upon the middle part of the upper side of the bar T, is formed a projection, $t^2$, to give a sufficient bearing to the binding and centering-screw, U, which passes down through the said bar. The lower end of the screw U is rounded off to enter the hole or depression in the projection $m^1$, of the cover M, so as to exactly centre the said mould at the same time that it binds it securely in its place. Upon the upper end of the screw U is formed a hand-wheel, $u'$, for convenience in operating the said screw. V is a bow or curved bar, to the middle of which is attached a handle, $v^1$, having a downwardly projecting ear, $v^2$, through which passes the guide-rod W, along which the bow V slides. The guide-rod W is pivoted to the lower end of the post O, as shown in fig. 3. The ends of the bow V are connected by a wire, $v^3$, which, when the bow V is pushed forward between the lower edge of the case K of the mould, and the upper edge of the cylinder B, separating or cutting the bottom of the moulded crucible or other vessel from the material remaining in the said cylinder, B. X is an apron attached to the flange $b'$, of the cylinder B, for convenience in filling the said cylinder with the plastic material from which the vessels are to be moulded. Y is an apron attached to the flange $b'$, of the cylinder B, for convenience in placing and removing the mould. The outer ends of the aprons or platforms, X and Y, are supported by braces, $x'$, $y'$, as shown in fig. 2. In using the machine, the piston-head D is turned down to the bottom of the cylinder B, and the said cylinder is filled with the plastic material. The mould is then secured in position, as before described, and the piston-head forced upward, forcing the plastic material into the mould, the air at the same time escaping through the air-holes $m^2$, shown in fig. 3. When the mould is filled the bottom of the moulded vessel is separated or cut off from the material in the cylinder B, by means of the wire, $v^3$, and bow V, as before described. In removing the moulded vessel from the mould, the pin $m^3$ is taken out, which admits the air between the core L and the said vessel, and allows the said core to be easily removed.

What I claim as new, and desire to secure by Letters Patent, is—

1. The combination of the cylinder B, piston-head D, screw piston-rod E, bevel gear-wheels F and G, shaft H, and crank-wheel J, with each other and with the frame A of the machine, substantially as herein described, and for the purpose set forth.

2. The combination of the case K, core L, and cover M, with each other, when said parts are constructed and arranged substantially as herein described, and for the purpose set forth.

3. The combination of the swinging guide-bar R, the swinging binding-bar T, and the binding and centering screw U, with each other, with the cover M, and with the posts O and P, substantially as described, and for the purpose set forth.

4. The combination of the bow V, wire $v^3$, and guide-rod W, with each other, and with the cylinders B and K, substantially as herein described, and for the purpose set forth.

SAMUEL R. THOMPSON.

Witnesses:
 ALBERT R. HATCH,
 CALVIN PAGE.